Feb. 18, 1936.  A. CLAUD-MANTLE  2,031,496
AUTOMOBILE ROBE SUPPORT AND BRACKET THEREFOR
Filed June 5, 1935  2 Sheets-Sheet 1
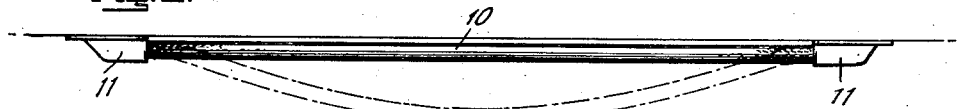
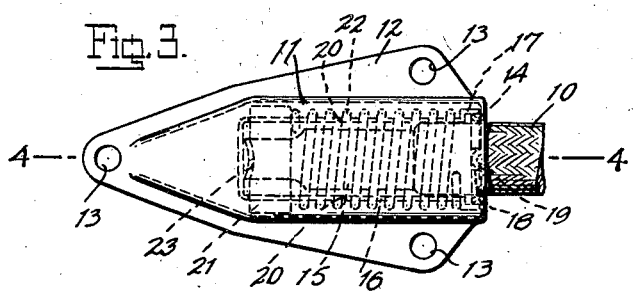
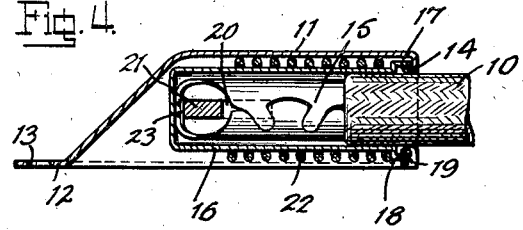
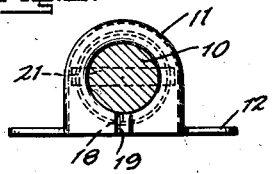
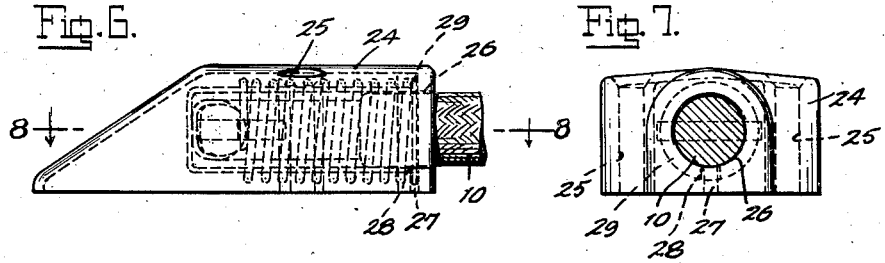
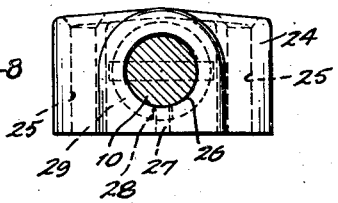
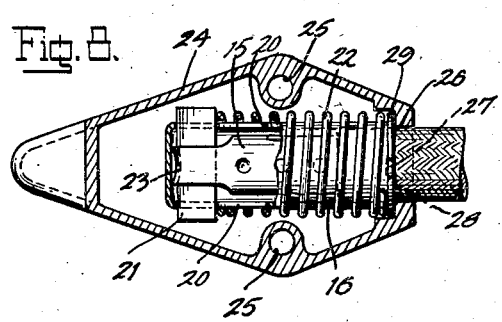
INVENTOR
ARTHUR CLAUD-MANTLE
BY
ATTORNEY Feb. 18, 1936.                A. CLAUD-MANTLE                2,031,496
            AUTOMOBILE ROBE SUPPORT AND BRACKET THEREFOR
                       Filed June 5, 1935           2 Sheets-Sheet 2
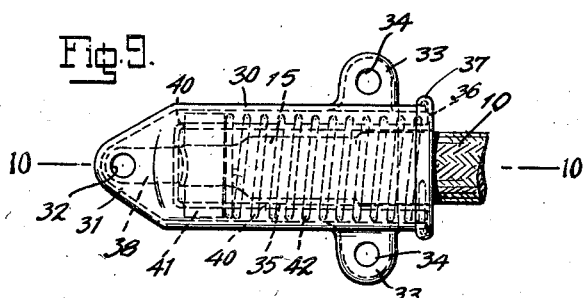
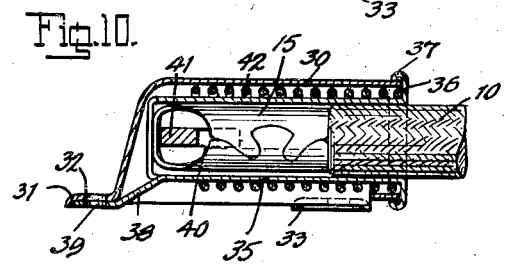
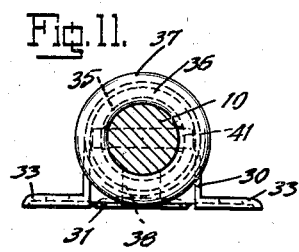
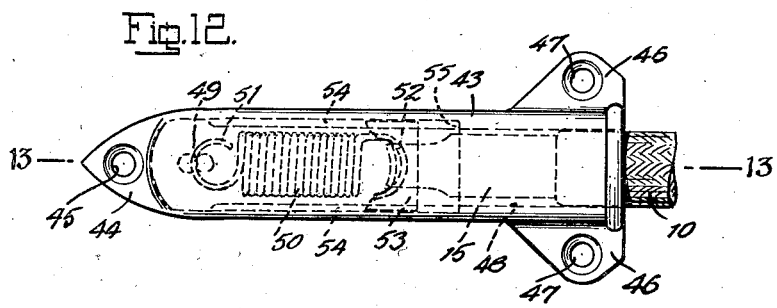
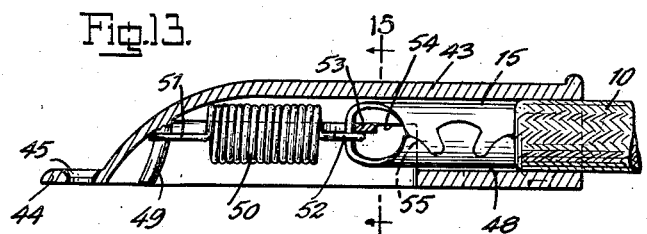
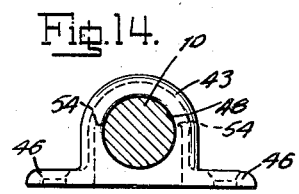
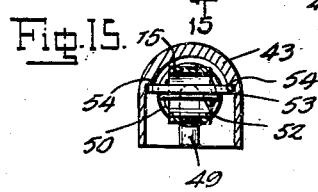
INVENTOR
ARTHUR CLAUD-MANTLE
BY
ATTORNEY Patented Feb. 18, 1936

2,031,496

UNITED STATES PATENT OFFICE 2,031,496

AUTOMOBILE ROBE SUPPORT AND BRACKET THEREFOR

Arthur Claud-Mantle, Trumbull, Conn., assignor to The Bassick Company, Bridgeport, Conn., a corporation of Connecticut Application June 5, 1935, Serial No. 25,067

8 Claims. (Cl. 24—123)

The present invention relates to an improved automobile robe support and bracket therefor, and has for an object to provide a robe support having a flexible non-elastic cord and attaching brackets receiving the ends of the cord and in which resilient connecting means are arranged to secure the ends of the cord to the attaching brackets, to the end that the cord will at all times remain taut, and when it is desired to support a robe or garment thereon it may be extended to receive the robe or garment and will then retain the same under spring pressure. A further object is to provide bracket means of simple and inexpensive construction and in which the parts may be readily assembled, and further to provide such construction which will receive the usual eye end piece of a conventional type of cord. Another object is to provide a resilient bracket structure in which the resilient action is limited to a predetermined extent whereupon pull on the cord will be transmitted to a solid support so that excess pressure will not be exerted upon the spring means.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a front elevation showing a robe rail and bracket, according to my invention.

Fig. 2 is a plan view thereof, the dot-and-dash lines showing the extended position of the cord.

Fig. 3 is a plan view of one form of bracket, according to my invention.

Fig. 4 is a longitudinal sectional view taken along the line 4—4 of Fig. 3.

Fig. 5 is an inner end elevation, the cord being shown in cross section.

Fig. 6 is a side elevation of a modified form of bracket, according to my invention.

Fig. 7 is an inner end elevation.

Fig. 8 is a horizontal sectional view taken along the line 8—8 of Fig. 6.

Fig. 9 is a plan view of another modified form of bracket, according to my invention.

Fig. 10 is a longitudinal sectional view taken along the line 10—10 of Fig. 9.

Fig. 11 is an inner end elevation.

Fig. 12 is a plan view of a further modified form of bracket, according to my invention.

Fig. 13 is a longitudinal sectional view taken along the line 13—13 of Fig. 12.

Fig. 14 is an inner end elevation.

Fig. 15 is a cross-sectional view taken along the line 15—15 of Fig. 13.

Similar reference characters indicate corresponding parts throughout the several figures of the drawings.

Referring to the drawings, and more particularly to Figs. 1 to 5 thereof, the exemplary illustrated embodiment of the invention shown therein comprises a flexible non-elastic cord member 10 slidably and resiliently connected at its ends within brackets which are secured to the back of the automobile seat. Inasmuch as these brackets are of identical construction only one of them will be described in detail.

The bracket comprises a casing 11, formed from pressed up sheet metal, having a securing flange 12 provided with screw holes 13 for attaching to the back of the seat. The casing is open at its under side and in its forward wall is provided with a circular opening for receiving the cord 10, this opening being provided with an inwardly curled flange 14. The cord 10 is provided upon its end with an eye clip member 15, this member being of well known construction and being tightly clamped about the end of the cord.

A cylindrical tubular member 16 is disposed within the casing, its rearward end being closed and its forward open end being provided with an outwardly offset annular flange 17 engaged about the inwardly turned flange 14 of the casing. In order to prevent rotary movement of the tubular member 16 the flange 17 is provided with a recess 18 engaged by an inwardly pressed lug portion 19 formed upon the front wall of the casing. The member 16 is provided with diametrically opposed longitudinally extending slots 20—20 adjacent its closed end and within these slots there is engaged a cross-piece 21 having its ends projecting outwardly, and normally pressed toward the rearward ends of the slots 20—20 by means of a helical spring 22 disposed about the tubular member 16 between the ends of the cross-piece 21 and the shoulder formed by the flange 17. The cross-piece 21 is adapted to engage the eye end of the clip member 15, being recessed at its rearward edge, as at 23, to conform to the transverse portion of the eye and thereby prevent lateral shifting movement of the cross-piece.

In assembling the cord with the bracket the clip member 15 is engaged through the flanged opening 14 within the tubular member 16, the member 16 during assembly being turned through an angle of 90° from its normal position so that the slots 20—20 are exposed at the open bottom.

This turning movement is permitted by the clearance between the end of the tubular member 16 and the casing 11 which is sufficient to enable the tubular member to be shifted rearwardly to disengage the recess 18 from the lug 19. With the tubular member in this position the cross-piece 21 may be slipped into place behind the spring 22 and thereupon the tubular member turned through 90° to its normal position, whereupon the recess 18 will snap into engagement with the lug 19. The length of the slots 20—20 is such that when the cord is pulled or extended a portion of the cord adjacent the clip 15 will remain within the casing at the limit of pull. When the cord is extended to its limit further pulling strain thereon is transmitted through the cross-piece 21 directly to the tubular member 15 which in turn is solidly supported by the casing, so that excessive pressure will not be exerted upon the spring.

In Figs. 6 to 8 I have illustrated a modified form of the invention in which the casing is in the form of a casting 24, this casting being of the same general shape as the sheet metal casing of the first embodiment. The casting 24 is provided with screw holes 25—25 for receiving attaching screws, a cord receiving opening 26 in its forward wall, and a lug 27 cast upon the inner surface of the forward wall to engage a recess 28 in the outwardly turned flange 29 of the tubular member 16. The construction and operation is otherwise the same as in the embodiment shown in Figs. 3 to 5.

In Figs. 9 to 11 I have illustrated another modified form of the invention, comprising a sheet metal casing 30, open at its lower side, provided at its rearward end with an attaching ear 31 having a screw hole 32, and provided at each side near the forward end with outwardly extending ears 33—33 each having a screw hole 34. The casing 30 is circumferentially continuous at the forward end and is open at the under side rearwardly of this forward circumferentially continuous portion. A tubular member 35 is disposed within the casing and is provided at its forward end with an outwardly turned flange 36 curled rearwardly, as at 37, to engage about the forward end of the casing. At the inner end of the tubular member 35 there is provided a strap portion 38, lanced from the tubular member, and bent rearwardly and downwardly and provided with an apertured foot portion 39 engaged with the ear 31 and registering with the screw hole 32, so that the screw extending through the hole 32 to secure the bracket to the seat back and also secures the strap portion 38 and the tubular member 35.

The tubular member 35 is provided, in a similar manner to the embodiments shown in Figs. 3 to 5 and 6 to 8 with diametrically disposed slots 40—40 engaged by a cross-piece 41 extended through the eye of the clip member 15, a helical spring 42 being disposed between the projecting ends of the cross-piece 41 and the flange 36 at the forward end of the tubular member 35. In this embodiment of the invention it will be observed that the pulling strain upon the cord is transmitted through the spring directly to the tubular member 35 and through the strap portion 38, which secures the tubular member directly to the seat back, the strain is transmitted directly to the seat back.

In Figs. 12 to 15 I have shown a further modified form of the invention in which a helical expansion spring is employed, instead of the compression springs as employed in the other embodiments. The casing 43 in this form is in the form of a casting provided with a rearward attaching ear 44 having a screw-hole 45 and a pair of side attaching ears 46—46 each having a screw hole 47. The forward portion of the casing is provided with a cylindrical portion 48 to slidably receive the cord 10 and rearwardly of this tubular portion 48 the casing is opened at its under side. A post 49 is formed upon the interior of the casing near its rearward end and the spring 50 has one hook end 51 engaged with this post and the other hook end 52 engaged with the eye of the clip 15. In order to prevent rotary movement of the clip 15 and to limit the outward pull of the cord a plate 53 is engaged in the eyelet and extends at its sides beneath a pair of longitudinally extending ledges 54 formed at each side of the casing. These ledges terminate at their forward ends in an abutment wall 55. As the cord is pulled outwardly the plate 53 slides along the ledges 54—54 and upon abutment with the wall 55 prevents further outward movement of the cord, whereupon the pulling strain is transmitted directly to the casing.

I have illustrated and described preferred and satisfactory embodiments of my invention, but it will be obvious, that changes may be made therein, within the spirit and scope thereof, as defined in the appended claims.

Having thus described my invention what I claim and desire to secure by Letters Patent is:—

1. A bracket for an automobile robe support, comprising a casing adapted to receive the end member of a robe supporting cord, spring means arranged in said casing to act between said end member and said casing to normally draw said cord toward said bracket, and abutment means arranged to limit the outward pull of said cord at a point between the normal expansion and compression limits of said spring means.

2. A bracket for an automobile robe support, comprising a casing adapted to receive the eye clip member of a robe supporting cord, spring means arranged in said casing to act between said clip and said casing to normally draw said cord toward said bracket, and abutment means arranged to limit the outward pull of said cord at a point between the normal expansion and compression limits of said spring means.

3. A bracket for an automobile robe support comprising a casing adapted to receive the eye clip member of a robe supporting cord, a cross-piece engaged through the eye of said clip member and projecting at each side, and a compression spring disposed between said cross-piece and said casing to normally draw said cord toward said bracket.

4. A bracket for an automobile robe support comprising a casing, a tubular member disposed in said casing having a pair of slots adjacent its inner end and adapted to receive the eye clip member of a robe supporting cord, a cross-piece engaged through the eye of said clip member and projecting at each side through said slots, and a helical compression spring disposed about said tubular member between said cross-piece and said casing to normally draw said cord toward said bracket.

5. A bracket for an automobile robe support comprising a casing, a tubular member disposed in said casing having a pair of slots adjacent its inner end and adapted to receive the eye clip member of a robe supporting cord, a cross-piece engaged through the eye of said clip member and projecting at each side through said slots, a helical compression spring disposed about said tubular member between said cross-piece and said casing to normally draw said cord toward said bracket, and means limiting the forward movement of said tubular member, outward pull of said cord adapted to be limited by engagement of said cross-piece with the forward end of said slot.

6. A bracket for an automobile robe support comprising a casing, a tubular member disposed in said casing having a pair of slots adjacent its inner end and adapted to receive the eye clip member of a robe supporting cord, a cross-piece engaged through the eye of said clip member and projecting at each side through said slots, a helical compression spring disposed about said tubular member between said cross-piece and said casing to normally draw said cord toward said bracket, means limiting the forward movement of said tubular member, outward pull of said cord adapted to be limited by engagement of said cross-piece with the forward end of said slot, and means cooperating between said tubular member and said casing to prevent rotation of said tubular member, said tubular member adapted to be moved rearwardly in said casing against the pressure of said spring to disengage said last mentioned means to permit rotation of said tubular member.

7. A bracket for an automobile robe support comprising a casing having an opening at one end adapted to receive the eye clip member of a robe supporting cord, and an expansion spring within said casing connected at one end to said casing and connected at its other end to the eye of said clip member.

8. A bracket for an automobile robe support comprising a casing having an opening at one end adapted to receive the eye clip member of a robe supporting cord, an expansion spring within said casing connected at one end to said casing and connected at its other end to the eye of said clip member, and abutment means arranged to limit the outward pull of said cord at a point between the normal expansion and compression limits of said spring.

ARTHUR CLAUD-MANTLE.